United States Patent [19]

Takahashi et al.

[11] Patent Number: 5,349,028
[45] Date of Patent: Sep. 20, 1994

[54] POLYESTER FIBERS

[75] Inventors: Tetuya Takahashi; Hitoshi Uda; Akira Nakamura; Ryosuke Kamei, all of Kawasaki; Eiichiro Takiyama, Kamakura, all of Japan

[73] Assignee: Showa Highpolymer Co., Ltd., Tokyo, Japan

[21] Appl. No.: 48,194

[22] Filed: Apr. 20, 1993

[30] Foreign Application Priority Data

| | | | |
|---|---|---|---|
| May 11, 1992 | [JP] | Japan | 4-117653 |
| May 11, 1992 | [JP] | Japan | 4-117654 |
| May 11, 1992 | [JP] | Japan | 4-117655 |
| May 11, 1992 | [JP] | Japan | 4-117656 |
| May 11, 1992 | [JP] | Japan | 4-117657 |
| May 12, 1992 | [JP] | Japan | 4-119197 |

[51] Int. Cl.$^5$ ............................................. C08F 20/00
[52] U.S. Cl. ........................... 525/440; 528/272; 528/288; 528/296; 528/302; 528/307; 528/350; 528/353; 525/437; 525/440
[58] Field of Search ............ 528/272, 271.2, 288, 528/296, 302, 350, 353, 307; 525/437, 440

[56] References Cited

U.S. PATENT DOCUMENTS

| | | | |
|---|---|---|---|
| 2,999,851 | 9/1961 | Elmer | 528/83 |
| 2,999,891 | 9/1961 | Elmer | 528/83 |
| 4,041,208 | 8/1977 | Seeger et al. | 428/424 |
| 4,057,537 | 11/1977 | Sinclair | 528/354 |
| 4,076,798 | 2/1978 | Casey et al. | 514/772.3 |
| 4,166,873 | 9/1979 | Gilliam | 428/35 |
| 5,068,143 | 11/1991 | Agger et al. | 428/241 |

FOREIGN PATENT DOCUMENTS

| | | |
|---|---|---|
| 0323700 | 7/1989 | European Pat. Off. . |
| 0393819 | 10/1990 | European Pat. Off. . |
| 0448294 | 9/1991 | European Pat. Off. . |
| 869243 | 1/1942 | France . |
| 1059075 | 3/1954 | France . |
| 1224858 | 6/1960 | France . |
| 748872 | 5/1956 | United Kingdom . |
| 1518500 | 7/1978 | United Kingdom . |

*Primary Examiner*—Samuel A. Acquah
*Attorney, Agent, or Firm*—Sughrue, Mion, Zinn, Macpeak & Seas

[57] ABSTRACT

Polyester fiber consisting of an aliphatic polyester having a melt viscosity of $1.0 \times 10^2 - 1.0 \times 10^4$ poises at a temperature of 190° C. at a shear rate of 1000 sec$^{-1}$ and a melting point of 70–190° C. The polyester fiber of the present invention exhibits biodegradability when buried in the ground. The amount of combustion heat generated on incineration is smaller than that of polyethylene and polypropylene. The polyester fiber of the present invention has excellent physical properties.

11 Claims, No Drawings

POLYESTER FIBERS

BACKGROUND OF THE INVENTION

1. Field of the Invention

The present invention relates to polyester fibers having excellent heat stability and mechanical strength which are prepared by using aliphatic polyesters with biodegradability and sufficiently high molecular weights and specific melt properties for practical use.

Particularly, the present invention relates to monofilament, parallel fiber, multifilament, staple, crimped fiber and composite fiber, which are formed by using the above aliphatic polyesters.

2. Discussion of the Background

Synthetic (plastic) fibers have recently been used for industrial materials, cloths and nonwoven fabric and the like, the resulting waste of the large amount of plastics used in these materials cause pollution of rivers, oceans, soil and the like and is becoming a great social problem. To prevent such pollution the development of biodegradable plastics has been desired; for example, poly(3-hydroxybutylate) produced by fermentation methods using microorganisms, blends of general-purpose plastics and starch, a naturally occurring polymer, and the like are already known. The former polymer has a drawback in that it is poor in molding properties because the polymer has a heat decomposition temperature close to its melting point and a raw material efficiency is very bad because it is produced by microorganisms. On the other hand, since the naturally occurring polymer of the latter does not by itself have thermoplasticity, the polymer has defects in molding properties, and is greatly limited in its range of application.

On the other hand, although it is known that aliphatic polyesters are biodegradable, they have hardly been used because polymeric material sufficient enough to obtain practical molded product cannot be obtained. Recently, it has been found that a ring-opening polymerization of ε-caprolactone produces a higher molecular weight polymer, and proposed to use the polymer as a biodegradable resin. However, the resulting polymer is limited to only special applications because of a low melting point of 62° C. and a high cost thereof. Further, although glycolic acid, lactic acid and the like are polymerized by a ring-opening polymerization of glycolide and lactide thereof to obtain polymers with higher molecular weights so as to be sometimes used as medical fibers and the like, the polymers are not used in great amounts as the above materials and the like because their decomposition temperatures are close to their melting point and they have defects in their molding properties.

Although most of these are applied to the industrial materials, cloths and nonwoven fabric, it is no exaggeration to say that high molecular weight polyesters (referring to polyesters having number-average molecular weights of at least 10,000) generally used for the plastics are limited to polyethylene terephthalate, a condensate of terephthalic acid (including dimethyl terephthalate) and ethylene glycol. Although there are cases of 2,6-naphthalenedicarboxylic acid being used instead of terephthalic acid, there are no reports of trials which obtained polymers with biodegradability.

Therefore, it is safe to say that there has been no concept of trying to make the fibers in practical use by using biodegradable aliphatic polyesters in which aliphatic dicarboxylic acid was used One of the reasons why this application concept has not been thought of is felt to be that in spite of the required special forming conditions and physical properties for the above fibers, most of the above-mentioned aliphatic polyesters have melting points of 100° C. or lower even if they are crystalline, and have poor heat stability when melted above that. Of further importance is that the properties, particularly mechanical properties such as tensile strength, of these aliphatic polyesters show markedly poor values even when they are the same level of number-average molecular weight as the above-mentioned polyethylene terephthalete, so just conceiving that the fibers having required strength and the like would be obtained was difficult.

Another reason seems to be that studies for improving the physical properties of the aliphatic polyesters by increasing their number-average molecular weights have not been sufficiently advanced because of their poor heat stability.

The object of the present invention is to provide polyester fibers prepared by the above-mentioned aliphatic polyesters as their components which have sufficient high molecular weights for practical use and excellent mechanical properties represented by heat stability and tensile strength, and which can be decomposed by microorganisms and the like, i.e., are biodegradable as one means of waste disposal so that they may be easily disposed of after the use thereof.

SUMMARY OF THE INVENTION

As a result of various studies of the reaction conditions for obtaining polyesters having sufficient high molecular weight for practical use and molding properties suitable for fiber forming, the present inventors have obtained specific aliphatic polyesters that maintain biodegradability while having sufficient high molecular weights for practical use, then have found that fibers prepared from the polyesters have heat stability and mechanical strength as well as the above-mentioned biodegradability to achieve the present invention.

That is, the present invention provides: (A) fibers mainly consisting of an aliphatic polyester having a melt viscosity of $1.0 \times 10^2 - 1.0 \times 10^4$ poises at a temperature of 190° C. and a shear rate of 1,000 $sec^{-1}$.

Further, the present invention provides the fibers of (A) which are monofilaments having a tensile strength of 2.0 to 12.0 g/d and a tensile elongation of 7 to 110%.

Furthermore, the present invention provides the fibers of (A) which are parallel fibers having a tensile strength of 2.0 to 12.0 g/d and a tensile elongation of 5 to 80% in the separated single fiber.

Further, the present invention provides the fibers of (A) which are multifilaments having a tensile strength of 2.0 to 10.0 g/d and a tensile elongation of 10 to 120%.

Furthermore, the present invention provides the fibers of (A) which are staples consisting of the multifilaments having a tensile strength of 2.0 to 10.0 g/d and a tensile elongation of 10 to 120%.

Further, the present invention provides the fibers of (A) which are crimped fibers having a tensile strength of 2.0 to 10.0 g/d and a percentage crimp of 3 to 20.

Still further, the present invention provides the fibers of (A) which are composite fibers comprising a sheath component made of one of a group of raw materials respectively consisting of as a main component a high-melting point aliphatic polyester and low-melting point aliphatic polyester; and a core component made of the other raw material.

DETAILED DESCRIPTION OF THE INVENTION

The present invention will be described below in further detail.

The aliphatic polyester of the present invention mainly consists of a polyester obtained by reacting two components of glycols and dicarboxylic acid (or acid anhydrides thereof), and if necessary as a third component, with at least one polyfunctional component selected from the group consisting of trifunctional or tetrafunctional polyols, oxycarboxylic acids, and polybasic carboxylic acids (or acid anhydrides thereof). The aliphatic polyesters are prepared by reacting relatively high molecular weight polyester prepolymers which have hydroxyl groups at ends with a coupling agent so as to make them even higher molecular weight polymer.

It has been known to obtain polyurethane by reacting a low molecular weight polyester prepolymer having a number-average molecular weight of 2,000–2,500, which have hydroxyl groups as the terminal groups, with diisocyanate as a coupling agent in the preparation of rubbers, foams, coatings and adhesives.

However, the polyester prepolymers used in these polyurethane foams, coatings and adhesives are prepolymers having a low molecular weight and a number-average molecular weight of 2,000–2,500 which is the maximum that can be prepared by non-catalytic reaction. To obtain practical physical properties as the polyurethane, it is necessary that the content of diisocyanate should be as much as 10–20 parts by weight in relation to 100 parts by weight of this low molecular weight prepolymer. When such a large amount of diisocyanate is added to the low molecular weight polyester melted at 150° C. or higher, gelation occurs so that no normal resins which can be molded in the form of a melt can be obtained.

Therefore, polyesters which are obtained by reacting a large amount of diisocyanate with a low molecular weight polyester prepolymers as a raw material cannot be used as the plastic raw material for the polyester fibers of the present invention.

Also, as shown in the case of polyurethane rubbers, although a method is conceivable in which hydroxyl groups are converted into isocyanate groups by the addition of diisocyanate, and then the number-average molecular weight thereof is further increased by using glycols, the same problem as mentioned above arises because 10 parts by weight of diisocyanate relative to 100 parts by weight of the prepolymer should be used in order to obtain practical physical properties.

When a relatively high molecular weight polyester prepolymer is to be used, heavy metal catalysts required to prepare the prepolymer would promote the reactivity of the above-mentioned isocyanate groups to undesirably cause poor preservativity, generation of crosslinking and branching; hence a number-average molecular weight of not more than around 2,500 of polyester prepolymers would be the limit if they were to be prepared without catalysts.

The polyester prepolymers to obtain the aliphatic polyesters used in the present invention are relatively high molecular weight saturated aliphatic polyesters having substantially hydroxyl groups at the ends thereof, number-average molecular weights of at least 5,000, preferably at least 10,000, and melting point of 60° C. or higher, which are obtained by reacting glycols and dibasic carboxylic acids (or acid anhydrides thereof) in the presence of catalysts. When a prepolymer having a number-average molecular weight of lower than 5,000 is used, the small amounts of 0.1–5 parts by weight of coupling agents used in the present invention cannot provide polyesters having good physical properties for injection molding. When polyester prepolymers having number-average molecular weights of 5,000 or higher are used, with hydroxyl values of 30 or less, the use of small amounts of coupling agents even under severe conditions such as a molten state and the like can produce high molecular weight polyesters without gelation as the reaction is not affected by remaining catalysts.

Therefore, the polymer for the polyester fibers of the present invention has a repeated chain structure in which a polyester prepolymer having a number-average molecular weight of 5,000 or more, preferably 10,000 or more and consisting of an aliphatic glycol and aliphatic dicarboxylic acid, is combined through the urethane bonds derived from, for example, diisocyanate as a coupling agent.

Further, the polymer for the polyester fibers of the present invention has a repeated chain structure in which the above-mentioned polyester prepolymer provided with branched long chains derived from polyfunctional components is combined through the urethane bonds derived from, for example, diisocyanate as a coupling agent. When oxazoline, epoxy compounds, and acid anhydrides are used as a coupling agent, the polyester prepolymer has a repeated chain structure through ester bonds.

When the polyester fibers of the present invention is buried in the ground, it exhibits biodegradability. The amount of combustion heat generated in incinerator is smaller than that of polyethylene and polypropylene. The polyester fibers of the present invention also has excellent thermal stability and mechanical strength.

Examples of glycols which can be used as a reaction component include aliphatic glycols. Among them those having a straight chain alkylene group with even number carbon atoms 2, 4, 6, 8 and 10 such as: ethylene glycol, 1,4-butanediol, 1,6-hexanediol, 1,8-octanediol, 1,10-decanediol, and mixtures thereof are preferable.

Of these glycols, those having a smaller number carbon atoms, such as ethylene glycol, 1,4-butanediol and 1,6-hexanediol, are preferable because they can produce an aliphatic polyester having a high crystallinity and a high melting point. In particular, ethylene glycol and 1,4butanediol are most suitable because they produce good results.

Examples of aliphatic dicarboxylic acids or anhydrides thereof which provide aliphatic polyester by reacting with glycols include aliphatic dicarboxylic acids. Among them those having a straight chain alkylene group with even number carbon atoms of 2, 4, 6, 8 and 10 such as: succinic acid, adipic acid, suberic acid, sebacic acid, 1,10-decanedicarboxylic acid, succinic anhydride and mixtures thereof are preferable. Of these dicarboxylic acids, those having a smaller number of carbon atoms, such as succinic acid, adipic acid and succinic anhydride, are preferable because they can produce an aliphatic polyester having high crystallinity and high melting points. In particular, succinic acid, succinic anhydride and an acid mixture of succinic acid or succinic anhydride and another dicarboxylic acid such as adipic acid, suberic acid, sebacic acid or 1,10-decanedicarboxylic acid are preferable.

In the system of an acid mixture containing two or more acid components, for example, succinic acid and other dicarboxylic acids, the mixing ratio of succinic acid is at least 70 mol %, preferably at least 90 mol %, and the mixing ratio of the other carboxylic acids is 30 mol % or less, preferably 10 mol % or less.

A combination of 1,4-butanediol and succinic acid or succinic anhydride and a combination of ethylene glycol and succinic acid or succinic anhydride are particularly preferable for the present invention because the combinations exhibit melting points close to that of polyethylene.

Third Component

To these glycols and dicarboxylic acid, if necessary, may be added as a third component at least one polyfunctional component selected from the group consisting of trifunctional or tetrafunctional polyols, oxycarboxylic acid, and polybasic carboxylic acids (or acid anhydrides thereof). The addition of this third component, which causes the branching of long chains, can impart desirable properties in molten state to the polyester prepolymer, because the ratio of weight-average molecular weight (MW)/number-average molecular weight (Mn), i.e., the molecular weight distribution, increases with increases in its molecular weight.

In terms of the amount of polyfunctional components to be added without fear of gelation, a trifunctional component of 0.1–5 mole %, or a tetrafunctional component of 0.1–3 mole % is added relative to 100 mole % of the total of aliphatic dicarboxylic acid (or acid anhydride thereof) components.

Polyfunctional Components

Examples of polyfunctional components as the third component include trifunctional or tetrafunctional polyols, oxycarboxylic acids, and polybasic-carboxylic acids.

The trifunctional polyols representatively include trimethylol propane, glycerin or anhydrides thereof. The tetrafunctional polyols representatively include pentaerythritol.

The trifunctional oxycarboxylic acid components are divided into the two types of (i) a component which has two carboxyl groups and one hydroxyl group in one molecule, and (ii) another component which has one carboxyl group and two hydroxyl groups in one molecule. Malic acid which has two carboxyl groups and one hydroxyl group in one molecule becomes practical and sufficient to the purposes of the present invention in view of commercial availability at low cost.

The tetrafunctional oxycarboxylic acid components are the following three types of components:
(i) A component which has three carboxyl groups and one hydroxyl group in one molecule;
(ii) Another component which has two carboxyl groups and two hydroxyl groups in one molecule; and
(iii) The remaining component which has three hydroxyl groups and one carboxyl group in one molecule.

Any type can be used, though in view of commercial availability at low cost, citric acid and tartaric acid are practical and sufficient to the purposes of the present invention.

As a trifunctional polybasic carboxylic acid (or acid anhydride thereof) component trimesic acid, propane tricarboxylic acid and the like can be used. Among them, trimesic anhydride is practical for the purposes of the present invention.

As a tetrafunctional polybasic carboxylic acid (or anhydride thereof) various types of aliphatic compounds, cycloaliphatic compounds, aromatic compounds and the like, described in certain literatures, can be used. In view of commercial availability, for example, pyromellitic anhydride, benzophenone tetracarboxylic anhydride and cyclopentane tetracarboxylic anhydride are practical and sufficient to the purposes of the present invention.

These glycols and dibasic acids are mainly consisted of aliphatic series, while small amounts of other components, for example, aromatic series may be concomitantly used. These other components may be blended or copolymerized in amounts up to 20% by weight, preferably up to 10% by weight, and more preferably up to 5% by weight because using these compounds degrades biodegradability.

The polyester prepolymer for aliphatic polyesters to be used in the present invention has hydroxyl groups at the terminals. To introduce the hydroxyl groups, it is necessary that glycols are used somewhat excessively.

For preparation of the polyester prepolymer having a relatively high molecular weight, it is necessary to use deglycol-reaction catalysts in the deglycol reaction subsequent to the esterification. Examples of the deglycol-reaction acetoacetoyl type titanium chelate compounds and organic alkoxy titanium compounds and the like. These titanium compounds can be used in combination. Examples of compounds used in combination include diacetoacetoxy oxytitanium (Nippon Chemical Industry Co., Ltd.; Nursem Titanium) tetraethoxy titanium, tetrapropoxy titanium, tetrabutoxy titanium and the like. The amount of the titanium compound used is 0.001–1 part by weight, and preferably 0.01–0.1 part by weight relative to 100 parts by weight of the polyester prepolymer. These titanium compounds may be blended before the esterification, or may be blended immediately before the deglycol-reaction.

To the polyester prepolymer which has a number-average molecular weight of at least 5,000, preferably at least 10,000, and whose terminal groups are substantially hydroxyl groups are added coupling agents in order to increase its number-average molecular weight.

Examples of the coupling agents include diisocyanate, oxazoline, diepoxy compounds, acid anhydrides and the like. Diisocyanate is particularly preferred.

In the cases of oxazoline and diepoxy compounds, it is necessary that the terminal hydroxyl groups are reacted with acid anhydrides and the like to convert them into carboxyl groups, then coupling agents are used.

Although not limited, examples of diisocyanate include 2,4-tolylene diisocyanate, a mixture of 2,4-tolylene diisocyanate and 2,6-tolylene diisocyanate, diphenylmethane diisocyanate, 1,5-naphthylene diisocyanate, xylylene diisocyanate, hydrogenated xylylene diisocyanate, hexamethylene diisocyanate, isophorone diisocyanate and the like. Particularly, hexamethylene diisocyanate is preferably used in terms of hue of prepared resins, reactivity at the time of blending polyesters, and the like.

The adding amounts of these coupling agents are 0.1–5 parts by weight, and preferably 0.5–3 parts by weight relative to 100 parts by weight of polyester prepolymer. Addition of less than 0.1 part by weight causes insufficient coupling reaction, whereas with more than 5 parts by weight gelation tends to occur.

The addition is preferably performed when the polyester is in a uniformly melted state under easily stirrable conditions. Although it is not impossible for the coupling agents to be added to the polyester prepolymer in the solid state and melted and mixed through an extruder, adding the agents in a polyester preparation unit, or adding them to polyester prepolymer in a melt state (for example, in a kneader) is more practical.

The aliphatic polyester to be used in the present invention is required to have selected melt properties for forming fibers by extrusion. That is, the aliphatic polyester to be used in the present invention needs to have a melt viscosity of $1.0 \times 10^2 - 1.0 \times 10^4$ poises, preferably $2.0 \times 10^2 - 9.0 \times 10^3$ poises, and more preferably $3.0 \times 10^2 - 4.0 \times 10^3$ poises at a temperature of 190° C. at a shear rate of 1,000 sec$^{-1}$.

With less than $1.0 \times 10^2$ poise, since a strand swings greatly during melt extrusion, it is difficult to wind the fiber, and satisfactory physical properties cannot be obtained even if the fiber can be wound.

With more than $1.0 \times 10^4$ poise, a strand is difficult or can only be performed at low stretch ratios.

The melt viscosity at a shear rate of 1,000 sec$^{-1}$ was calculated from a graph which shows the relation between the apparent viscosities and shear rates measured using a nozzle having a diameter of 1.0 mm and L/D of 10 at a resin temperature of 190° C.

The melting point of the aliphatic polyester to be used in the present invention needs to be 70–190° C. preferably 70–150° C., and more preferably 80–135° C. A melting point lower than 70° C. will give injection-molded articles poor heat resistance to distort them, whereas with higher than 190° C. it is difficult to carry out injection molding.

To achieve a melting point higher than 70° C. the polyester prepolymer need to have a melting point of at least 60° C.

When urethane bonds are contained in the alphatic polyester to be used in the present invention, the amount of urethane bonds is 0.03–3.0% by weight, preferably 0.05–2.0% by weight, and more preferably 0.1–1.0% by weight.

The amount of urethane bonds is measured by $^{13}$C NMR, showing good correlation with the charged amount.

Less than 0.03% by weight of urethane bonds has a little effect on polymerization and leads to poor molding properties, whereas more than 3% by weight causes gelation.

It is needless to say that when the above-mentioned aliphatic polyester is used to obtain the fibers according to the present invention, if necessary, lubricants, waxes, coloring agents, crystallizing promoters and reinforcing fibers as well as antioxidants, thermal stabilizers, UV absorbers and the like can be used concomitantly.

That is, antioxidants include hindered phenol antioxidants such as p-tert-butyl hydroxytoluene and p-tertbutyl hydroxyanisole, sulfur antioxidants such as distearyl thiodipropionate and dilauryl thiodipropionate, and the like; heat stabilizers include triphenyl phosphite, trilauryl phosphite, tris-nonylphenyl phosphite and the like; UV absorbers include p-tert-butyl phenyl salicylate, 2-hydroxy-4-methoxybenzophenone, 2-hydroxy-4-methoxy-2'-carboxybenzophenone, 2,4,5-trihydroxybutylophenone and the like; lubricants include calcium stearate, zinc stearate, barium stearate, sodium palmirate and the like; antistatic agents include N,N-bis(hydroxyethyl) alkyl amine, alkyl amine, alkyl allyl sulfonate, alkyl sulfonate and the like; flame retarders include hexabromocyclododecane, tris-(2,3-dichloropropyl) phosphate, pentabromophenyl allyl ether and the like; inorganic fillers include calcium carbonate, silica, titanium oxide, talc, mica, barium sulfate, alumina and the like; crystallizing promoters include polyethylene terephthalate, poly-trans-cyclohexane dimethanol terephthalate and the like; reinforcing fibers include inorganic fibers such as glass fiber, carbon fiber, boron fiber, silicon carbide fiber, graphite fiber, alumina fiber and amorphous fiber, and organic fibers such as aramide fiber, and the like.

The raw material used in the present invention comprising as a main component an aliphatic polyester is generally melted and spun, cooled with water and stretched under heating to form a fiber.

The polyester monofilament of the present invention has physical properties such as tensile strength and tensile elongation within the ranges of 2.0 to 12.0 g/d and 7 to 110%, preferably within the ranges of 4.0 to 12.0 g/d and 10 to 40%, respectively. With a tensile strength of less than 2.0 g/d, the filament cannot be put into practical use. With a tensile elongation of less than 7% the filaments cannot be used smoothly due to their poor flexibility. On the other hand, with a tensile elongation of more than 110%, the filament cannot be easily put into practical use because of large dimensional changes.

In the case of the production of the parallel fibers of the present invention, the raw material is spun by using a spinning nozzle having 3 to 8 holes which are arranged in a row or at intervals of 1.0 mm or less. The parallel fibers of the present invention have preferably a tensile strength of 2.0–12.0 g/d and tensile elongation of 5–80% in terms of split monfilament.

Further, the multifilament of the present invention has a tensile strength of 2.0 to 10 g/d and tensile elongation of 10 to 120%.

In the case of the production of the staples of the present invention, the multifilament can be cut in appropriate lengths to obtain staples. The multifilament may be crimped for providing good feeling and bulkiness and then cut in an appropriate length to form staple. The thus-formed staples can be used as materials for spun yarn, non-woven fabric or binders thereto. The multifilament of the present invention comprising an aliphatic polyester has a tensile strength of 2.0 to 10 g/d, and a tensile elongation of 10 to 120% providing excellent staples.

In the case of the production of the crimped fiber of the present invention, the crimping temperature is 60 to 100° C., preferably 75 to 90° C. At lower than 60° C., crimped fibers having a sufficient percentage of crimp cannot be obtained, and at higher than 100° C., the yarn is frequently cut during crimping.

Furthermore, the composite fiber of the present invention is formed by melt composite spinning and comprises a sheath component mainly consisting of one either the high-melting point component or the low-melting point component, and a core component mainly consisting of the other component. There are two types of core-sheath composite fibers including a type in which a core component and a sheath component are concentrically disposed, and the other eccentiric type in which the center of a core component is shifted from the center of a composite fiber. Both types of composite fibers are included in the composite fiber of the present invention.

The spinning temperature is generally 170 to 240° C., preferably 180 to 190° C. At a spinning temperature close to the melting point, the fiber easily cuts during spinning. At more than 240° C., the filament swings greatly and easily cuts during spinning. Although stretching may be made by using a wet stretching bath, an oven, a heated roll or the like, the stretching temperature is 50 to 100° C., preferably 70 to 90° C. At less than 50° C., the filament cannot be easily stretched, and at more than 100° C., the filament easily cuts during stretching.

When the aliphatic polyester obtained in the present invention having a number-average molecular weight of at least 10,000, preferably at least 20,000 exhibits a melting point of 70 to 190° C. and crystallinity, excellent various fibers can be formed.

EXAMPLES

The present invention will be illustrated with reference to the following Examples and Comparative Examples but the invention is not intended to be limited only thereto.

In the following Examples, the tensile strength and elongation at the breakage of a sample were measured by pulling a sample with an initial length of 300 mm at a pulling rate of 100%/min using a tensile tester manufactured by Orientec Co., Ltd. (JIS L-1013)

The biodegradability was examined by determining changes in the practical tensile strength from the touch of the sample after the sample was buried in the ground for a predetermined period.

EXAMPLE 1

A 700 L reactor was purged with nitrogen, then 183 kg of 1,4-butanediol and 224 kg of succinic acid were charged in it. After the temperature was elevated under nitrogen stream, esterification by dehydration condensation was carried out for 3.5 hr at 192–220° C., and after ceasing nitrogen charge, for further 3.5 hr under reduced pressures of 20–2 mmHg. A sample collected had an acid value of 9.2 mg/g, a number-average molecular weight (Mn) of 5,160 and a weight-average molecular weight (Mw) of 10,670. Subsequently, 34 g of tetraisopropoxy titanium, a catalyst, was added at normal pressures under nitrogen stream. The temperature was elevated to carry out a deglycol-reaction at temperatures of 215–220° C. under reduced pressures of 15–0.2 mmHg for 5.5 hr. A sample collected had a number-average molecular weight (Mn) of 16,800 and a weight-average molecular weight (Mw) of 43,600. The yield of resulting polyester prepolymer (A1) was 339 kg except condensate water.

5.42 kg of hexamethylene diisocyanate was added to the reactor containing 339 kg of the polyester prepolymer (A1) to perform a coupling reaction for 1 hr at 180–200° C. The viscosity was rapidly increased, but no gelation occurred. Then, 1.70 kg of Irganox 1010 (Ciba-geigy) as an antioxidant and 1.70 kg of calcium stearate as a lubricant were added, and the mixture was further stirred for 30 min. The resulting reaction product was extruded into water, and cut by a cutter into pellets. The aliphatic polyester (B1) obtained after drying in a vacuum at 90° C. for 6 hr had a yield of 300 kg.

The obtained polyester (B1) was a slightly ivory-like white, waxy crystal, and had a melting point of 110° C., a number-average molecular weight (Mn) of 35,500 a weight-average molecular weight (Mw) of 170,000, a MFR (190° C.) of 1.0 g/10 min, a viscosity of 230 poises in a 10% orthochlorophenol solution and a melt viscosity of $4.8 \times 10^3$ poises at a temperature of 190° C. at a shear rate of 1000 sec$^{-1}$. The average molecular weight was measured by a Shodex GPC System-11 (Showa Denko, gel permiation chromatography) using a HFIPA solution containing 5 mmol CF$_3$COONa (concentration of 0.1% by weight) as a medium. A calibration curve was drawn using a PMMA standard sample (Shodex Standard M-75, Showa Denko).

The polyester (B1) was extruded through a nozzle (1.0 mm$\phi$, L/D=10) at a molding temperature of 230° C., and was hardened by cooling in a water bath at 30° C. The thus obtained unstretched yarn was stretched by 6 times by a wet stretching bath at 80° C. to produce a monofilament of 400 denier.

Measurement of the tensile strength of the monofilament obtained showed a value of 5.8 g/d and an elongation value of 21.4%, and that the monofilament was significantly tough.

However, when the monofilament was buried in the ground for 5 months, the tensile strength was degraded to a level with no to practical applicability.

EXAMPLE 2

The polyester (B1) used in Example 1 was extruded through a nozzle (1.0 mm$\phi$, L/D=10) at a molding temperature of 170° C., and was hardened by cooling in a water bath at 30° C. The thus obtained unstretched yarn was stretched by 6 times by a wet stretching bath at 80° C. to produce a monofilament of 400 denier.

Measurement of the tensile strength of the monofilament obtained showed a value of 5.2 g/d and an elongation value of 22.3%, and that the monofilament was significantly tough.

However, when the monofilament was buried in the ground for 5 months, the tensile strength was degraded to a level with no practical applicability.

EXAMPLE 3

The polyester (B1) used in Example 1 was extruded through a nozzle (1.0 mm$\phi$, L/D=10) at a molding temperature of 230° C., and was hardened by cooling in a water bath at 30° C. The thus-obtained unstretched yarn was stretched by 6 times by a wet stretching bath at 90° C. to produce a monofilament of 400 denier.

Measurement of the tensile strength of the monofilament obtained showed a value of 4.8 g/d and an elongation value of 20.8%, and that the monofilament was significantly tough.

However, when the monofilament was buried in the ground for 5 months, the tensile strength was degraded to a level with no practical applicability.

EXAMPLE 4

A 700 L reactor was purged with nitrogen, then 177 kg of 1,4-butanediol, 198 kg of succinic acid and 25 kg of adipic acid were charged in it. After the temperature was elevated under nitrogen stream, esterification by dehydration condensation was performed for 3.5 hr at 190–210° C., and after ceasing nitrogen charge, for further 3.5 hr under reduced pressures of 20–2 mmHg. A sample collected had an acid value of 9.6 mg/g, a number-average molecular weight (Mn) of 6,100 and weight-average molecular weight (Mw) of 12,200. Subsequently, 20 g of tetraisopropoxy titanium, a catalyst, was added at normal pressures under nitrogen stream. The temperature was elevated to perform a deglycol-reaction at temperatures of 210–220° C. under reduced pressures of 15–0.2 mmHg for 6.5 hr. A sample collected had a number-average molecular weight (Mn) of 17,300 and a weight-average molecular weight (Mw) of 46,400. The resulting polyester (A2) had a yield of 337 kg except condensate water.

4.66 kg of hexamethylene diisocyanate was added to the reactor containing 337 kg of polyester (A2) to perform a coupling reaction for 1 hr at 180–200° C. The viscosity was rapidly increased, but no gelation occurred. Then, 1.70 kg of Irganox 1010 (Ciba-Geigy) as an antioxidant and 1.70 kg of calcium stearate as a lubricant were added, and the mixture was further stirred for 30 min. The resulting reaction product was extruded into water by an extruder, and cut by a cutter into pellets. The aliphatic polyester (B2) obtained after drying in a vacuum at 90° C. for 6 hr had a yield of 300 kg.

The obtained polyester (B2) was a slightly ivory-like white, waxy crystal, and had a melting point of 103° C., a number-average molecular weight (Mn) of 36,000, a weight-average molecular weight (Mw) of 200,900, a MFR (190° C.) of 0.52 g/10 min, a viscosity of 680 poises in a 10% orthochlorophenol solution and a melt viscosity of $5.0 \times 10^3$ poises at a temperature of 190° C. at a shear rate of 1,000 sec$^{-1}$.

The polyester (B2) was extruded through a nozzle (1.0 mm$\phi$, L/D=10) at a molding temperature of 230° C., and was hardened by cooling in a water bath at 30° C. The thus obtained unstretched yarn was stretched by 6 times by a wet stretching bath at 90° C. to produce a monofilament of 400 denier.

Measurement of the tensile strength of the monofilament obtained showed a value of 5.8 g/d and an elongation value of 19.24%, and that the monofilament was significantly tough.

However, when the monofilament was buried in the ground for 5 months, the tensile strength was degraded to a level with no practical applicability.

EXAMPLE 5

The polyester (B2) used in Example 4 was extruded through a nozzle (1.0 mm$\phi$, L/D=10) at a molding temperature of 170° C., and was hardened by cooling in a water bath at 30° C. The thus obtained unstretched yarn was stretched by 6 times by a wet stretching bath at 80° C. to produce a monofilament of 400 denier.

Measurement of the tensile strength of the monofilament obtained showed a value of 5.7 g/d and an elongation value of 22.0%, and that the monofilament was significantly tough.

However, when the monofilament was buried in the ground for 5 months, the tensile strength was degraded to a level with practical applicability.

EXAMPLE 6

The polyester (B2) used in Example 4 was extruded through a nozzle (1.0 mm$\phi$, L/D=10) at a molding temperature of 230° C., and was hardened by cooling in a water bath at 30° C. The thus obtained unstretched yarn was stretched by 6 times by a wet stretching bath at 90° C. to produce a monofilament of 400 denier.

Measurement of the tensile strength of the monofilament obtained showed a value of 5.0 g/d and an elongation value of 21.0%, and that the monofilament was significantly tough.

However, when the monofilament was buried in the ground for 5 months, the tensile strength was degraded to a level with no practical applicability.

EXAMPLE 7

A 700 L reactor was purged with nitrogen, then 145 kg of ethylene glycol, 251 kg of succinic acid and 4.1 kg of citric acid were charged in it. After the temperature was elevated under nitrogen stream, esterification by dehydration condensation was performed for 3.5 hr at 190–210° C., and after ceasing nitrogen charge, for further 5.5 hr under reduced pressures of 20–2 mmHg. A sample collected had an acid value of 8.8 mg/g, a number-average molecular weight (Mn) of 6,800 and a weight-average molecular weight (Mw) of 13,500. Subsequently, 20 g of tetraisopropoxy titanium, a catalyst, was added at normal pressures under nitrogen stream. The temperature was elevated to perform a deglycol-reaction at temperatures of 210–220° C. under reduced pressures of 15–0.2 mmHg for 4.5 hr. A sample collected had a number-average molecular weight (Mn) of 33,400 and a weight-average molecular weight (Mw) of 137,000. The resulting polyester (A3) had a yield of 323 kg except condensate water.

3.23 kg of hexamethylene diisocyanate was added to the reactor containing 323 kg of polyester (A3) to perform a coupling reaction for 1 hr at 180–200° C. The viscosity was rapidly increased, but no gelation occurred. Then, 1.62 kg Irganox 1010 (Ciba-Geigy) as an antioxidant and 1.62 kg of calcium stearate as a lubricant were added, and the mixture was further stirred for 30 min. The resulting reaction product was extruded into water by an extruder, and cut by a cutter into pellets. The polyester (B3) obtained after drying in a vacuum at 90° C. for 6 hr had a yield of 300 kg.

The obtained polyester (B3) was a slightly ivory-like white, waxy crystal, and had a melting point of 96° C., a number-average molecular weight (Mn) of 54,000, a weight-average molecular weight (Mw) of 324,000, a MFR (190° C.) of 1.1. g/10 min, a viscosity of 96 poises in a 10% orthochlorophenol solution and a melt viscosity of $4.7 \times 10^3$ poises at a temperature of 190° C. at a shear rate of 1,000 sec$^{-1}$.

COMPARATIVE EXAMPLE 1

The polyester (A1) used in Example 1 was extruded through a nozzle (1.0 mm$\phi$, L/D=10) at a molding temperature of 250° C., and was hardened by cooling in a water bath at 30° C.

The filaments cut at a stretch ratio of about 2 times in a spinning stage, and thus a stretched yarn with a high stretch ratio could not be produced.

EXAMPLE 8

The polyester (B1) used in Example 1 was extruded through a nozzle (1.0 mm$\phi$, 5 holes in a raw, 6 blocks (30 holes), L/D=10) at a molding temperature of 230° C., and hardened by cooling in a water bath at 30° C. The unstretched parallel obtained were then stretched by 6 times using a wet stretching bath at 80° C. to form parallel fibers of 400 denier.

Measurement of the tensile strength of the separated single fiber of the parallel fibers obtained showed a tensile strength of 5.0 g/d, an elongation of 20.5%, and the fibers were significantly tough.

When the parallel fibers were buried in the group for 5 months, the fibers degraded to state having no strength for practical use.

EXAMPLE 9

The polyester (B1) used in Example 1 was extruded through a nozzle (1.0 mmφ, 5 holes in a raw, 6 blocks (30 holes), L/D = 10) at a molding temperature of 170° C., and hardened by cooling in a water bath at 30° C. The unstretched parallel fibers obtained were then stretched by 6 times using a wet stretching bath at 80° C. to form parallel fibers of 400 denier.

Measurement of the tensile strength of the separated single fiber of the parallel fibers obtained showed a tensile strength of 4.4 g/d, an elongation of 22.4%, and the fibers were significantly tough.

When the parallel fibers were buried in the ground for 5 months, the fibers degraded to state having no strength for practical use.

EXAMPLE 10

The polyester (B1) used in Example 1 was extruded through a nozzle (1.0 mmφ, 8 holes in a raw, 4 blocks (32 holes), L/D=10) at a molding temperature of 230° C., and hardened by cooling in a water bath at 30° C. The unstretched parallel fibers obtained were then stretched by 6 times using a wet stretching bath at 90° C. to form parallel fibers of 400 denier.

Measurement of the tensile strength of the separated single fiber of the parallel fibers obtained showed a tensile strength of 4.5 g/d, an elongation of 20.8%, and the fibers were significantly tough.

When the parallel fibers were buried in the ground for 5 months, the fibers degraded to state having no strength for practical use.

EXAMPLE 11

The polyester (B2) used in Example 4 was extruded through a nozzle (1.0 mmφ, 5 holes in a raw, 6 blocks (30 holes), L/D=10) at a molding temperature of 230° C., and hardened by cooling in a water bath at 30° C. The unstretched parallel fibers obtained were then stretched by 6 times using a wet stretching bath at 80° C. to form parallel fibers of 400 denier.

Measurement of the tensile strength of the separated single fiber of the parallel fibers obtained showed a tensile strength of 5.6 g/d, an elongation of 19.2%, and the fibers were significantly tough.

When the parallel fibers were buried in the ground for 5 months without being separated into fibers, the fibers degraded to state having no strength for practical use.

EXAMPLE 12

The polyester (B2) used in Example 4 was extruded through a nozzle (1.0 mmφ, 5 holes in a raw, 6 blocks (30 holes), L/D=10) at a molding temperature of 170° C., and hardened by cooling in a water bath at 30° C. The unstretched parallel fibers obtained were then stretched by 6 times using a wet stretching bath at 80° C. to form parallel fibers of 400 denier.

Measurement of the tensile strength of the separated single fiber of the parallel fibers obtained showed a tensile strength of 5.1 g/d, an elongation of 22.1%, and the fibers were significantly tough.

When the parallel fibers were buried in the ground for 5 months without being separated into fibers, the fibers degraded to state having no strength for practical use.

EXAMPLE 13

The polyester (B2) used in Example 4 was extruded through a nozzle (1.0 mmφ, 5 holes in a raw, 6 blocks (30 holes), L/D=10) at a molding temperature of 230° C., and hardened by cooling in a water bath at 30° C. The unstretched parallel obtained were then stretched by 6 times using a wet stretching bath at 90° C. to form parallel fibers of 400 denier.

Measurement of the tensile strength of the separated single fiber of the parallel fibers obtained showed a tensile strength of 4.7 g/d, an elongation of 21.1%, and the fibers were significantly tough.

When the parallel fibers were buried in the ground for 5 months without being separated into fibers, the fibers degraded to state having no strength for practical use.

EXAMPLE 14

The polyester (B3) used in Example 7 was extruded through a nozzle (1.0 mmφ, 5 holes in a raw, 6 blocks (30 holes), L/D=10) at a molding temperature of 230° C., and hardened by cooling in a water bath at 30° C. The unstretched parallel fibers obtained were then stretched by 6 times using a wet stretching bath at 80° C. to form parallel fibers of 400 denier.

Measurement of the tensile strength of the separated single fiber of the parallel fibers obtained showed a tensile strength of 5.4 g/d, an elongation of 20.4%, and the fibers were significantly tough.

When the parallel fibers were buried in the ground for 5 months without being separated into fibers, the fibers degraded to state having no strength for practical use.

COMPARATIVE EXAMPLE 2

The polyester (A1) was formed under the same condition as in Example 8. However, the fibers cut at a stretch ratio of about 2 times in a stretching stage, and thus an intended parallel fibers could not be produced.

EXAMPLE 15

A 700 L reactor was purged with nitrogen, then 183 kg of 1,4-butanediol and 224 kg of succinic acid were charged in it. After the temperature was elevated under nitrogen stream, esterification by dehydration condensation was carried out for 3.5 hr at 195–210° C., and after ceasing nitrogen charge, for further 3.5 hr under reduced pressures of 20–2 mmHg. A sample collected had an acid value of 9.2 mg/g, a number-average molecular weight (Mn) of 5,200 and a weight-average molecular weight (Mw) of 10,100. Subsequently, 34 g of tetraisopropoxy titanium, a catalyst, was added at normal pressures under nitrogen stream. The temperature was elevated to carry out a deglycol-reaction at temperatures of 215–220° C. under reduced pressures of 5–0.2 mmHg for 7.5 hr. A sample collected had a number-average molecular weight (Mn) of 18,600 and a weight-average molecular weight (Mw) of 50,300. The yield of resulting polyester prepolymer (A4) was 339 kg except condensate water.

4.07 kg of hexamethylene diisocyanate was added to the reactor containing 339 kg of the polyester prepolymer (A4) to perform a coupling reaction for 1 hr at 180–200° C. The viscosity was rapidly increased, but no gelation occurred. Then, 1.70 kg of Irganox 1010 (Ciba-geigy) as an antioxidant and 1.70 kg of calcium stearate as a lubricant were added, and the mixture was further stirred for 30 min. The resulting reaction product was extruded into water, and cut by a cutter into pellets. The aliphatic polyester (B4) obtained after drying in a vacuum at 90° C. for 6 hr had a yield of 270 kg.

The obtained polyester (B4) was a slightly ivory-like white, waxy crystal, and had a melting point of 110° C., a number-average molecular weight (Mn) of 29,500 a weight-average molecular weight (Mw) of 127,000, a MFR (190° C.) of 9.2 g/10 min, a viscosity of 170 poises in a 10% orthochlorophenol solution and a melt viscosity of $3.0 \times 10^3$ poises at a temperature of 190° C. at a shear rate of 1,000 $sec^{-1}$. The average molecular weight was measured by the same manner as in Example 1.

The polyester (B4) was extruded through a 0.6 mm$\phi$ multifilament spinning nozzle having 68 holes in a 40 mm$\phi$ extruder at a temperature of 200° C. and a discharge rate of 50 g/d.

The extruded unstretched multifilament was cooled by a cooling duct having a length of 900 mm at a cooling temperature of 18° C. and a cooling air speed of 0.5m/min. After a polyether surfactant was applied as a binder to the multifilament by a binder application roller, the multifilament was wound at a speed of 100 m/min to obtain an unstretched multifilament with a total size of about 4,800 denier. The unstretched multifilament was then stretched by 6 times using a pair of heat stretching godet rollers at a stretching rate of 1,000 m/min. The surface temperature of the heat stretching godet rollers was 70° C.

The measured strength and elongation of the multifilament obtained were 5.2 g/d and 35%, respectively.

When the multifilament was buried in the ground for 5 months, the multifilament degraded to a state having no practical strength or elongation.

EXAMPLE 16

The polyester (B4) obtained by Example 15 was extruded through a 0.6 mm$\phi$ multifilament spinning nozzle having 68 holes in a 40 mm$\phi$ extruder at an extension temperature of 200° C. and a discharge rate of 120 g/d.

The extruded unstretched multifilament was cooled by a cooling duct having a length of 900 mm at a cooling temperature of 18° C. and a cooling air speed of 0.5m/min. After a polyether surfactant was applied as a binder to the multifilament by a binder application roller, the multifilament was wound by a pair of heat stretching rollers at a speed of 300 m/min, and was stretched at a rate of 2,000 m/min. The surface temperature of the heat stretching godet rollers was 70° C.

The measured strength and elongation of the multifilament obtained were 5.5 g/d and 29%, respectively.

When the multifilament was buried in the ground for 5 months, the multifilament degraded to a state unable to withstand normal use.

EXAMPLE 17

The polyester (B4) obtained by Example 15 was extruded through a 0.6 mm$\phi$ multifilament spinning nozzle having 68 holes in a 40 mm$\phi$ extruder at an extension temperature of 190° C. and a discharge rate of 130 g/d.

The extruded unstretched multifilament was cooled by a cooling duct having a length of 900 mm at a cooling temperature of 18° C. and a cooling air speed of 0.5m/min. After a polyether surfactant was applied as a binder to the multifilament by a binder application roller, the multifilament was wound by a pair of heat stretching rollers at a speed of 300 m/min, and was stretched at a rate of 2,000 m/min. The surface temperature of the heat stretching godet rollers was 70° C.

The measured strength and elongation of the multifilament obtained were 5.0 g/d and 27%, respectively.

When the multifilament was buried in the ground for 5 months, the multifilament degraded to a state unable to withstand normal use.

COMPARATIVE EXAMPLE 3

Although the polyester (A4) was molded under the same conditions as those employed in Example 15, the filament cut in the course of stretching, and the objective stretched multifilament could not be obtained.

EXAMPLE 18

The polyester (B4) obtained by Example 15 was extruded through a 0.6-mm$\phi$ multifilament spinning nozzle having 68 holes using a 40-mm$\phi$ extruder with a discharge rate of 50 g/d. The extrusion temperature was 200° C.

After the extruded unstretched multifilament was cooled by a cooling duct having a length of 900 mm at a cooling temperature of 18° C. and a cooling air speed of 0.5 m/min, a binder was applied to the multifilament by a binder application roller. The multifilament was then wound at a speed of 100 m/min to obtain an unstretched multifilament with a total size of about 4800 denier. The multifilament was then stretched by 6 times by a staple fiber experimental tester and was cut in lengths of 51 mm to obtain staples.

The measured strength and elongation of the obtained staples were 4.9 g/d and 43%, respectively. When the staples were buried in the ground for 5 months, the staples degraded to a state having no strength.

EXAMPLE 19

The polyester (B4) obtained by Example 15 was melted and extruded by an extruder having a screw diameter of 40 mm$\phi$ a nozzle diameter of 0.6 mm$\phi$ and 68 holes at a screw temperature of 190° C., a head temperature of 200° C. and a nozzle temperature of 205° C. After a binder was applied to the unstretched extruded multifilament by a roller, the multifilament was stretched by 4 times at 70° C., and was crimped by a crimping nozzle using heated air at 80° C. to obtain a crimped yarn.

The measured strength and elongation of the crimped yarn obtained were 2.9 g/d and 70%, respectively. The percentage crimp and the crimp elasticity which were measured according to JIS L1036 and L1074 were 10.7 and 71.5, respectively.

The crimp was not changed by heat treatment at 60° C. for 30 minutes.

The crimped yarn was cut in lengths of 51 mm and deposited on a moving wire gauze to form a web with weight of 10 g/m$^2$. The thus-formed web was then passed through an embossing roll to form a nonwoven fabric.

When the nonwoven fabric was buried in the ground for 5 months, the strength of the fibers was decreased to a level without no practicability as nonwoven fabric.

COMPARATIVE EXAMPLE 4

Although the polyester (A1) was molded under the same conditions as those employed in Example 15, a filament was frequently cut during stretching, and thus intended staples could not be obtained.

EXAMPLE 20

The polyester (B4) Obtained by Example 15 was melted and extruded by an extruder having a screw diameter of 40 mm$\phi$, a nozzle diameter of 0.6 mm$\phi$ and 68 orifices at a screw temperature of 190° C., a head temperature of 200° C. and a nozzle temperature of 205. After a binder was applied to the unstretched extruded multifilament by a roller, the filament was stretched by 6 times at 70° C., and crimped by a crimping nozzle using heated air at 80° C. to obtain a crimped yarn.

The measured strength and elongation of the crimped yarn obtained were 4.0 g/d and 45%, respectively. The percentage of crimp and the crimp elasticity were 13.2 and 80.5, respectively.

The crimp was not changed by heat treatment at 60° C. for 30 minutes.

When the crimped fiber was buried in the ground for 5 months, the crimped fiber had degraded to a state where nothing of the initial shape remained.

EXAMPLE 21

The polyester (B4) obtained by Example 15 was melted and extruded by an extruder having a screw diameter of 40 mm$\phi$, a nozzle diameter of 0.6 mm$\phi$, and 68 orifices at a temperature of 190° C., a head temperature of 200° C. and a nozzle temperature of 205° C. After a binder was applied by a roller to the unstretched extruded multifilament, the filament was stretched by 4 times at 70° C. and was crimped by a crimping nozzle using heated air at 80° C. to obtain a crimped yarn.

The measured strength and elongation of the crimped yarn obtained were 2.9 g/d and 70%, respectively. The percentage of crimp and the crimp elasticity were 10.7 and 71.5, respectively.

The crimp was not changed by heat treatment at 60° C. for 30 minutes.

When the crimped fiber was buried in the ground for 5 months, the crimped fiber had degraded to a state having no practical strength or crimp elasticity.

EXAMPLE 22

The polyester (B4) obtained by Example 15 was melted and extruded by an extruder having a screw diameter of 40 mm$\phi$, a nozzle diameter of 0.6 mm$\phi$ and 128 orifices at a screw temperature of 200° C., a head temperature of 210° C. and a nozzle temperature of 200° C. After a binder was applied by a roller to the unstretched extruded multifilament, the filament was stretched by 6 times at 70° C. and was crimped by a crimping nozzle using heated air at 80° C. to obtain a crimped yarn.

The measured strength and elongation of the crimped yarn obtained were 4.3 g/d and 42%, respectively. The percentage of crimp and the crimp elasticity were 17 and 90.4, respectively.

The crimp was not changed by heat treatment at 60° C. for 30 minutes.

When the crimped fiber was buried in the ground for 5 months, the crimped fiber degraded to a state having no practical strength or crimp elasticity.

COMPARATIVE EXAMPLE 5

The polyester (A4) used in Example 15 was spun under the same conditions as those employed in (Example 20), stretched and then crimped by heated air at 110° C.

The filament cut during crimping, and a stable crimped fiber could not be obtained.

EXAMPLE 23

Polyester (B2) used in Example 4 having a low melting point and serving as a low-melting-point component, and polyester (B1) used in Example 1 having a high melting point and serving as a high-melting-point component were used as a sheath component and a core component, respectively. Both components were extruded from a composite fiber spinning apparatus comprising two monoaxial extruders and a multifilament nozzle having a hole diameter of 0.6 mm$\phi$ and 120 holes at a spinning temperature of 200° C. and a take-up speed of 500 mm/min to obtain core-sheath type composite fibers having a single yarn size of 10 denier. The core-sheath type composite fibers comprised the core component and the sheath component, both of which are concentrically disposed, and had a ratio of sectional areas of 1:1.

The thus obtained composite fibers were stretched by a staple fiber trial manufacturing apparatus with a stretch ratio of 5 times, oiled, crimped, dried, crimped by heated air at 100° C. and then cut to obtain composite fibers having a single yarn size of 3 denier, a cut length of 51 mm and a crimp number of 15/inch and a percentage crimp of 17%.

The composite fibers were passed three times through a sample card machine having a width of 350 mm to form a uniform web with weight of 20 g/m$^2$. The thus-formed web was placed on a wire-gauze belt having a width of 350 mm at a speed of 5 m/min, and the composite fibers of the web were welded by hot air at a temperature of 120° C. to form a non-woven fabric. The fabric exhibited breaking lengths of 1500 m and 7000 m in the TD direction and in the MD direction, respectively, and excellent heat weldability.

When the non-woven fabric was buried in the ground for 5 months, the fabric lost its shape, and the tensile strength of the composite fibers was also decreased showing the degradation of the non-woven fabric.

What is claimed is:

1. Polyester fiber comprising an aliphatic polyester having a melt viscosity of $1.0 \times 10^2 - 1.0 \times 10^4$ poises at a temperature of 190° C. and a shear rate of 100 sec$^{-1}$, and having a melting point of 70–190° C.
   wherein said aliphatic polyester is obtained from ingredients consisting essentially of diisocyanate and a prepolymer in a molten state by adding from 0.1 to 5 parts by weight of diisocyanate to 100 parts by weight of the prepolymer in a molten state,
   wherein said prepolymer
   is obtained from a reaction of at least an aliphatic glycol and an aliphatic dicarboxylic acid, wherein the reaction includes (a) succinic acid, or its anhydride, reacted with 1,4-butanediol, (b) succinic acid, adipic acid, or their anhydride, reacted with 1,4-butanediol, or (c) succinic acid, or its anhydride, reacted with ethylene glycol, and
   has a number-average molecular weight of at least 10,000.

2. The polyester fiber as claimed in claim 1 wherein said fiber is a monofilament having a tensile strength of 2.0 to 12.0 g/d and a tensile elongation of 7 to 110%.

3. The polyester fiber as claimed in claim 1 wherein said fiber is a parallel fiber having a tensile strength of 2.0 to 12.0 g/d and a tensile elongation of 5 to 80% in a separated single fiber.

4. The polyester fiber as claimed in claim 1 wherein said fiber is a multifilament having a tensile strength of 2.0 to 10.0 g/d and a tensile elongation of 10 to 120%.

5. The polyester fiber as claimed in claim 1 wherein said fiber is a staple consisting of the multifilaments having a tensile strength of 2.0 to 10.0 g/d and a tensile elongation of 10 to 120%.

6. The polyester fiber as claimed in claim 1 wherein said fiber is a crimped fiber having a tensile strength of 2.0 to 10.0 g/d and a percentage crimp of 3 to 20.

7. The polyester fiber as claimed in claim 1 wherein said fiber is a composite fiber comprising a sheath component made of one of a group of raw materials respectively consisting of as a main component a high-melting point aliphatic polyester and low-melting point aliphatic polyester; and a core component made of the other raw material.

8. The polyester fiber as claimed in claim 1 wherein the aliphatic polyester has a repeated chain structure in which a polyester prepolymer having a number-average molecular weight (Mn) of 1,000 or more and obtained by reacting the aliphatic glycol, the aliphatic dicarboxylic acid and, as a third component, at least one polyfunctional component selected from the group consisting of trifunctional or tetrafunctional polyols, oxycarboxylic acids and polybasic carboxylic acids or acid anhydrides thereof, is combined through urethane bonds.

9. The polyester fiber as claimed in claim 8 wherein the polyester prepolymer contains one or more compounds selected from the group consisting of trimethylol propane, glycerin and pentaerythritol as the trifunctional or tetrafunctional polyol of the third component.

10. The polyester fiber as claimed in claim 8 wherein the polyester prepolymer contains one or more compounds selected from the group consisting of malic acid, citric acid and tartaric acid as the trifunctional or tetrafunctional oxycarboxylic acid of the third component.

11. The polyester fiber as claimed in claim 8 wherein the polyester prepolymer contains one or more compounds selected from the group consisting of trimesic acid, propane tricarboxylic acid, trimellitic anhydride, pyromellitic anhydride, benzophenone tetracarboxylic anhydride and cyclopentane tetracarboxylic anhydride as the trifunctional or tetrafunctional polybasic carboxylic acid the third component.

* * * * *